Aug. 19, 1924.
E. H. BELDEN
COWL VENTILATOR FOR MOTOR VEHICLES
Filed Nov. 30, 1917   2 Sheets-Sheet 2
1,505,528
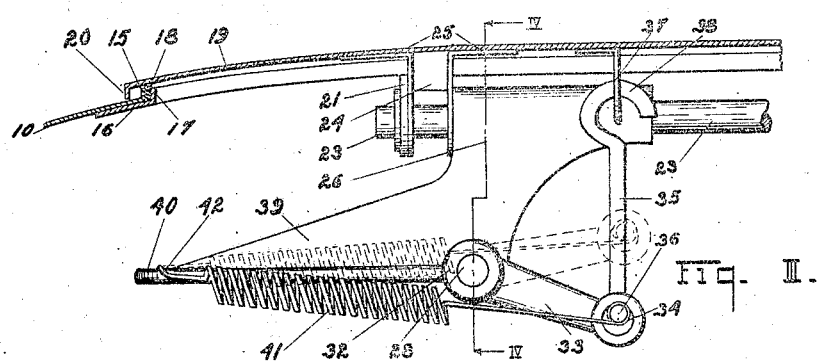
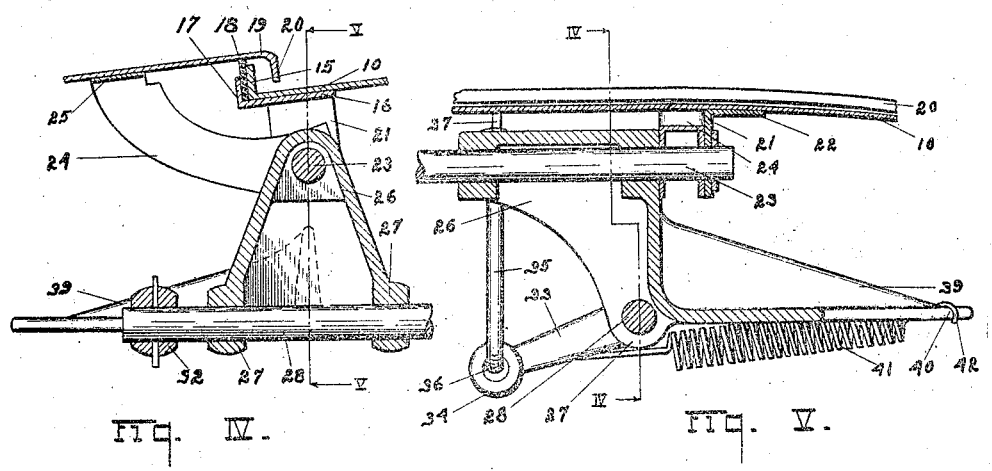
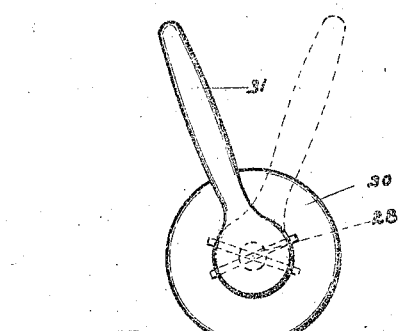
Inventor
Edward H. Belden
By Chester H Braselton
Attorney Patented Aug. 19, 1924.

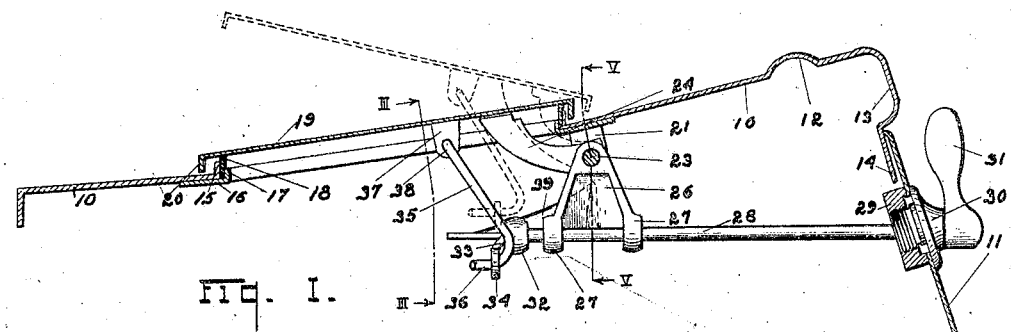
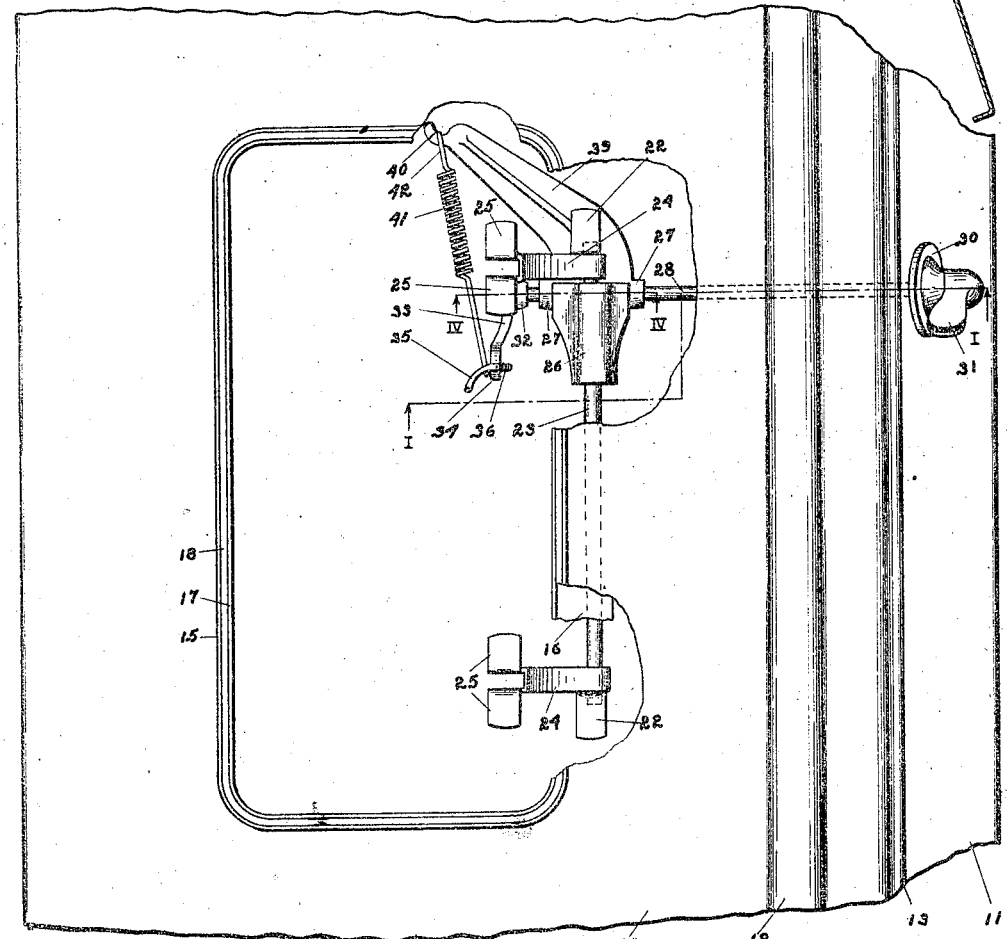

1,505,528

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

COWL VENTILATOR FOR MOTOR VEHICLES.

Application filed November 30, 1917. Serial No. 204,633.

*To all whom it may concern:*

Be it known that I, EDWARD H. BELDEN, a citizen of the United States, residing at Toledo, in the county of Lucas and State of Ohio, have invented certain new and useful Improvements in Cowl Ventilators for Motor Vehicles, of which I declare the following to be a full, clear, and exact description.

This invention relates to improvements in cowl ventilators for motor vehicles.

The principal object of this invention is to provide improved means for ventilating a motor vehicle, comprising a ventilating opening in the cowl thereof and a cover for said opening, together with improved means for hingedly connecting said covering to the cowl.

A further object of my invention is to provide a means for ventilating motor vehicles comprising a cowl having an opening therein and a cover for closing said opening, together with means for moving said cover accessible from the instrument board of the motor vehicle.

A further object of this invention is to provide simple and efficient means, accessible from the instrument board of the motor vehicle for operating the cowl ventilator, said means being of such a nature as to resiliently hold the cover for the ventilator opening either in open or closed position.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Fig. I is a view, partly in section through the cowl and instrument board of a motor vehicle, showing the operating means for the cowl ventilator in side elevation, said section being taken on the line I—I of Fig. II.

Fig. II is a top plan view of the cowl ventilator showing the cover removed and a part of the cowl broken away to show the operating mechanism.

Fig. III is an enlarged, detail, sectional view, taken substantially on the line III—III of Fig. I.

Fig. IV is a detail, sectional view, taken substantially on the line IV—IV of Figs. II, III and V.

Fig. V is a detail, sectional view, taken substantially on the line V—V of Figs. I and IV, and Fig. VI is a view in front elevation showing the operating means fixed to the instrument board.

In the drawings, similar reference numerals refer to similar parts throughout the several views, and the sectional views are taken looking in the direction of the little arrows at the ends of the section lines.

Considering the numbered parts of the drawing, I have shown a cowl 10 and an instrument board 11, the forward edge of the cowl being provided with the bead 12 and with a downwardly extending portion 13, having a flange 14, which is disposed behind the upper edge of the instrument board 11. A ventilating opening is formed in the cowl, and said opening is provided with the flange 15, which is formed by turning up the edge of the cowl adjacent said opening. A strip 16 forms a border for said opening and the inner edge of said strip is turned up to form the flange 17, the strip 16 being secured to the under face of the cowl in any suitable manner such as by spot welding. The rubber strip 18 is secured between the flanges 15, and 17, and forms a buffer, upon which the cover 19, which closes the ventilating opening in the cowl, is adapted to rest, said cover 19 being provided with a downwardly extending marginal flange 20. This rubber strip 18 forms a bumper or resilient rest for the cover 19 closing the opening, so as to prevent its rattling.

The brackets 21 are provided with the flanges 22, which are secured to the under surface of the cowl 10, near the edge of the ventilating opening therein, in any suitable manner such as by means of spot welding. These brackets 21 carry the hinge pintle 23, which extends parallel to one edge, preferably the rear edge, of the ventilating opening in the cowl and is spaced a short distance below the lower surface of the cowl. The arms 24 are mounted on the hinge pintle 23 and extend forwardly and upwardly therefrom, having the laterally extending flanges 25 at their upper ends secured to the cover 19, so that the arms 24, the pintle 23, and the brackets 21 form a hinge connection between the cover 19 and the cowl, which hinge connection is entirely concealed within the cowl.

The hanger 26 is mounted on the hinge pintle 23, the upper part of the hanger being provided with a transverse passage through which the hinge pintle 23 extends. The lower portion of the hanger is provided with a pair of bosses 27, provided with suitable aligned openings, in which the shaft 28 is journaled, said shaft extending transversely to the hinge pintle 23 and below the same. A journal block 29 is provided, abutting the rear base of the instrument board 11, and a boss 30 abuts the forward face of the instrument board and has a hub screwed into the journal block 29. The shaft 28 extends rearwardly from the hanger 26 and its rear end is journaled in the block 29 and extends through the instrument board. A handle 31 is provided on the rear end of the shaft 28 by means of which the shaft may be rotated.

The hub 32 of an arm 33 is secured to the forward end of the shaft 28, beyond the hanger 26, and the free end of said arm 33 is provided with an eye 34, as shown in Fig. III. A link 35 is connected at one end to the arm 33, by means of its laterally turned end 36, which extends through the eye 34. The other end of said link 35 is provided with a hook-shaped head 38, which extends through a suitable opening provided in a bracket 37 secured to the under face of the cover 19.

The hanger 26 is provided, adjacent to and in the same horizontal plane with the shaft 28, with a laterally and forwardly extending arm 39, which is provided with a notch 40 at its extreme forward end. One end of spring 41 is connected to the extreme end of the arm 39 by a hooked portion engaging the notch 40, while the other end of said spring is connected to the end 36 of the link 35, which extends through the eye 34 of the arm 33, as clearly shown in Fig. III of the drawing.

From the description of the parts given above, the operation of this device should be very readily understood. In Fig. I, the ventilator is shown closed in full lines and open in dotted lines. It will be seen that the cover 19 for the ventilating opening is hinged to the cowl by means of the arms 24, which are connected to the hinge pintle 23, mounted in the brackets or hangers 21, secured to the lower face of the cowl 10, adjacent the opening therein. The hanger 26, which carries the operating shaft 28, is carried by the hinge pintle 23. By rotating the shaft 28, a movement will be transmitted to the arm 33, which will move the link 35 upwardly as shown in dotted lines to Fig. 1, so as to open the cover 19 of the ventilating opening. The rotation of the shaft 28 is effected by means of the handle 31, which projects from the instrument board so as to be within convenient reach of the operator of the motor vehicle.

The spring 41 is provided with a hooked portion 42 connected to one end to the arm 39, which is a part of the hanger 26 and hence fixed with reference to the cowl, and the other end of the spring is connected to the moving arm 33. Referring to Fig. III of the drawing, it will be seen that when the arm is in the position in which the ventilator is closed, the line of force of the spring 41 will be directed below the axis of the shaft 28, which carries the arm 33. On the other hand, when the arm 33 is in the position in which the ventilator is open, the line of force of the spring 41 will be directed on the opposite side of the axis of the shaft 28. It follows from this that the spring 41 will serve to resiliently maintain the cover 19 either in open or closed position, and hence will tend to prevent rattling of the cover. The spring, however, will yield sufficiently to permit the ventilating mechanism to be moved from open to closed position. The rubber strip on which the cover 19 rests when the ventilator is closed, also serves to prevent rattling, as it serves to prevent the metal cover striking against the metal of the cowl.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a motor vehicle, the combination of a cowl, provided with a ventilating opening therein; a cover for said opening; brackets secured to the lower face of said cowl and depending therefrom; a hinge pintle carried by said brackets; hinge arms connecting said cover and said pintle; a hanger carried by said pintle; a shaft journaled in said hanger; means for rotating said shaft; and connections between said shaft and said cover, whereby the rotation of said shaft opens and closes said cover.

2. In a motor vehicle, the combination of a cowl, provided with a ventilating opening therein; a cover for said opening; brackets secured to the lower face of said cowl and depending therefrom; a hinge pintle carried by said brackets; hinge arms connecting said pintle and said cover; a hanger carried by said pintle; a shaft journaled in said hanger; means for rotating said shaft; an arm mounted on said shaft; and connections between said arm and said cover.

3. In a motor vehicle, the combination of a cowl, provided with a ventilating opening therein; a cover for said opening; brackets secured to the lower face of said cowl and depending therefrom; a hinge pintle carried by said brackets; hinge arms connecting said pintle and said cover; a hanger carried by said pintle; a shaft journaled in said hanger and extending transversely of said hinge pintle; means for rotating said shaft; an arm secured to said shaft; and a link connecting the end of said arm and said cover.

4. In a motor vehicle, the combination of a cowl, provided with a ventilating opening therein; a cover for said opening; brackets secured to the lower face of said cowl and depending therefrom; a hinge pintle carried by said brackets; hinge arms connecting said pintle and said cover; a hanger carried by said pintle; a shaft journaled in said hanger and extending transversely of said pintle; means for rotating said shaft; an arm secured to said shaft; a link connecting said arm and said cover; said hanger being provided with a laterally projecting arm disposed in the same horizontal plane with said shaft; and a spring connecting the end of said hanger arm and the end of the arm mounted on the shaft.

5. In a motor vehicle, the combination of a cowl, having a ventilating opening therein; an instrument board; a cover for said opening; hinge connections between said cover and said cowl disposed within said cowl; a suitably journaled rotatable shaft, having one end extending through said instrument board; means for rotating said shaft; connections between said shaft and cover comprising an arm secured to said shaft and a link connecting said arm and said cover; and spring means one end of which is secured to said arm for retaining said cover in either opened or closed position.

6. In a motor vehicle, the combination of a cowl, provided with a ventilating opening therein; a cover for said opening; a hanger having a forwardly extending arm fixed relatively to said cowl; a shaft journaled in said hanger; means for rotating said shaft; an arm secured to said shaft; connections between said arm and said cover; and a spring connected, at one end to the forwardly extending arm of said hanger and in the same horizontal plane with said shaft, and, at the other end, to said arm.

7. In a motor vehicle, the combination of a cowl, having a ventilating opening therein, the edges of said cowl adjacent said opening being turned up to form a marginal flange, a strip secured to said cowl adjacent the edges of said opening and provided with an upturned flange, a strip of resilient material clamped between said flanges; and a cover for said opening provided with a downturned marginal flange.

8. In a motor vehicle, the combination of a cowl, having a ventilating opening therein, the edges of said cowl adjacent said opening being turned up to form a marginal flange, a strip secured to said cowl adjacent the edges of said opening and provided with an upturned flange, a strip of resilient material clamped between said flanges; and a cover for said opening.

9. In combination with the cowl portion of an automobile having a ventilating opening therein, a cover for said opening, a pintle carried by said cowl on which the cover is pivotally mounted, an operating shaft rotatably mounted at right angles to the pintle, means for raising and lowering the cover upon rotation of the rotatable shaft and spring means for retaining said cover in either opened or closed position.

10. The combination with the cowl portion of an automobile having a ventilating opening therein, a pintle carried by said cowl adjacent said opening, a cover for said opening, pivotally mounted on said pintle, a depending bracket carried by said pintle, a shaft rotatably mounted in the bracket, means for raising and lowering the cover from the rotatable shaft and spring means for retaining said cover in either opened or closed position.

In testimony whereof, I affix my signature.

EDWARD H. BELDEN.